United States Patent
Collins et al.

(10) Patent No.: US 9,797,184 B2
(45) Date of Patent: Oct. 24, 2017

(54) METHOD OF OPERATING AN AUTOMATIC DOOR INSTALLATION

(71) Applicant: Ensota Limited, Swindon (GB)

(72) Inventors: Peter Collins, Swindon (GB); John Curzon, Swindon (GB)

(73) Assignee: Ensota Limited, Swindon (GB)

( * ) Notice: Subject to any disclaimer, the term of this patent is extended or adjusted under 35 U.S.C. 154(b) by 0 days.

(21) Appl. No.: 14/701,993

(22) Filed: May 1, 2015

(65) Prior Publication Data

US 2015/0315834 A1 Nov. 5, 2015

(30) Foreign Application Priority Data

May 2, 2014 (GB) .................................. 1407843.0

(51) Int. Cl.
*E06B 3/00* (2006.01)
*E05F 15/78* (2015.01)
(Continued)

(52) U.S. Cl.
CPC .............. *E05F 15/78* (2015.01); *B66B 13/22* (2013.01); *B66B 13/24* (2013.01); *B66B 13/26* (2013.01);
(Continued)

(58) Field of Classification Search
CPC . E05F 15/78; E05F 15/73; E05F 15/43; E05F 15/40; E05F 2015/434; G01V 8/20;
(Continued)

(56) References Cited

U.S. PATENT DOCUMENTS

2012/0217098 A1* 8/2012 Putkinen et al. ............ 187/293
2014/0076904 A1* 3/2014 Wood et al. ............... 220/573.1
2015/0316410 A1* 11/2015 Collins et al.

FOREIGN PATENT DOCUMENTS

GB         2402433 A   8/2004
WO         0009966 A2  2/2000
(Continued)

OTHER PUBLICATIONS

Search Report issued by British Intellectual Property Office in related British Patent Application No. GB1407843.0 dated Nov. 3, 2014 (3 pages).
Office Action issued by the Chinese Patent Office dated Nov. 28, 2016 in related Application No. 201510216688.1.

*Primary Examiner* — Jerry Redman
(74) *Attorney, Agent, or Firm* — Gesmer Updegrove LLP

(57) ABSTRACT

A method is disclosed of operating an automatic door installation comprising door sensor equipment including a door sensor. The automatic door installation is operable in at least a standard mode, in which the door sensor equipment conducts an obstacle check to determine whether an obstacle is present according to a first obstacle check procedure, and a contingency mode, in which the door sensor equipment conducts the obstacle check according to a different second obstacle check procedure. The method includes the steps of evaluating an operating condition of the automatic door installation; determining whether the operating condition lies within a standard operating range; and operating the automatic door installation in the contingency mode when the operating condition lies outside a respective standard operating range.

13 Claims, 5 Drawing Sheets

Figure 1:
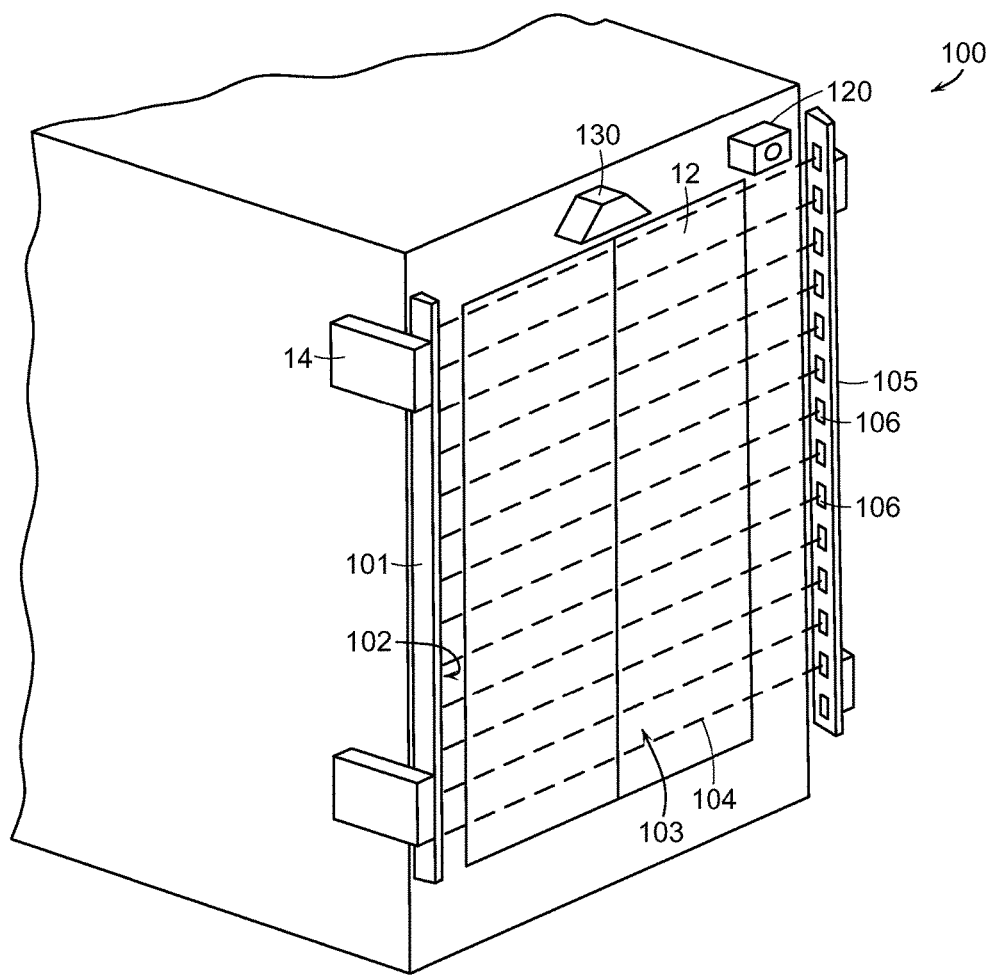

(51) Int. Cl.
    *E05F 15/40* (2015.01)
    *E05F 15/43* (2015.01)
    *B66B 13/22* (2006.01)
    *B66B 13/24* (2006.01)
    *B66B 13/26* (2006.01)
    *G01V 8/12* (2006.01)
    *G01V 8/20* (2006.01)
    *E05F 15/73* (2015.01)

(52) U.S. Cl.
    CPC ............. *E05F 15/40* (2015.01); *E05F 15/43* (2015.01); *E05F 15/73* (2015.01); *G01V 8/12* (2013.01); *G01V 8/20* (2013.01); *E05F 2015/434* (2015.01); *E05Y 2400/36* (2013.01); *E05Y 2400/45* (2013.01); *E05Y 2900/104* (2013.01)

(58) Field of Classification Search
    CPC .......... G01V 8/12; B66B 13/26; B66B 13/22; B66B 13/24; E05Y 2400/36; E05Y 2400/45; E05Y 2900/104
    USPC .................................... 49/115, 118
    See application file for complete search history.

(56) References Cited

FOREIGN PATENT DOCUMENTS

| WO | 2007018539 A2 | 2/2007 |
| WO | 2009060543 A1 | 5/2009 |

\* cited by examiner

METHOD OF OPERATING AN AUTOMATIC DOOR INSTALLATION

CROSS-REFERENCE TO RELATED APPLICATIONS

The present invention claims priority to British Patent Application No. 1407843.1, filed on May 2, 2014, which is incorporated herein by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION (1) Field of the Invention

The invention relates to a method of operating an automatic door installation comprising door sensor equipment for conducting an obstacle check, in which method the automatic door installation is operable in a standard mode or a contingency mode depending on an operating condition of the automatic door installation.

(2) Description of Related Art Including Information Disclosed Under 37 C.F.R. §1.97 and 1.98

Automatic door installations, such as entrance doors for a building and elevator installations are provided with a number of sensors to ensure safe operation of the door installation, in particular the closing of the doors. For example, an elevator car of an elevator installation is typically provided with a door sensor for detecting the presence of an obstacle, such as a person or an object, in front of or between the elevator car doors. For example, the door sensor may be an optical door sensor, such as a break beam sensor, that forms a light curtain of infrared light outside of the elevator car doors (i.e. between the elevator car doors and the shaft doors when the elevator car is at a stop). The optical door sensor typically determines that there may be an obstacle in front of the elevator car doors when an emitted light signal is not detected by a receiver.

The operation of such an automatic door installation depends on whether the door sensor determines the presence of an obstacle or not. In the example of an elevator installation, confirmation that no obstacle is present is typically required before an elevator car can begin to move, and the doors may be prevented from closing if the door sensor determines that an obstacle is present. Accordingly, the door sensor can essentially cause the elevator installation to be taken out of service if it incorrectly determines that an obstacle is present, thereby preventing access to a building or other facility. Similarly, entrance doors will only open if an obstacle is determined to be present, and may not close whilst an obstacle is determined to be present. Access to a building or other facility can therefore be limited if the door sensor fails to correctly determine the presence of an obstacle.

The performance of the door sensor can depend on the operating conditions of the automatic door installation. For example, the performance of the door sensor can be affected by, amongst other things, optical and/or electronic noise and the temperature of the door sensor equipment. Deterioration of these and other operating conditions of the automatic door installation can prevent the door sensor from functioning normally, which may cause it to incorrectly determine that an obstacle is present. Accordingly, deterioration of the operating conditions of the automatic door installation can ultimately cause it to be temporarily taken out of service.

It is therefore desirable to provide an improved automatic door installation which is less prone to being taken out of service and can continue to operate despite deterioration of its operating conditions.

BRIEF SUMMARY OF THE INVENTION

According to an aspect of the invention there is provided a method of operating an automatic door installation comprising door sensor equipment including a door sensor, the automatic door installation being operable in at least a standard mode, in which the door sensor equipment conducts an obstacle check to determine whether an obstacle is present according to a first obstacle check procedure, and a contingency mode, in which the door sensor equipment conducts the obstacle check according to a different second obstacle check procedure, the method comprising: evaluating an operating condition of the automatic door installation; determining whether the operating condition lies within a standard operating range; and operating the automatic door installation in the contingency mode when it is determined that the operating condition lies outside the respective standard operating range. Determining whether the operating condition lies within the standard operating range may comprise determining whether a measure of the operating condition lies within the standard operating range.

Therefore the automatic door installation can be operated in at least two different modes. The contingency mode is for operation outside of standard operating conditions, and the second obstacle check procedure can be defined to enable continued operation of the door sensor equipment under such conditions. The second obstacle check procedure can differ from the first obstacle check procedure in a number of different ways that may increase the probability of the obstacle check correctly determining the presence or absence of an obstacle. The difference between the second obstacle check procedure and the first obstacle check procedure may depend on the operating condition that lies outside its respective standard operating range, and the extent to which it lies outside the standard operating range.

The method may comprise operating the automatic door installation in the standard mode when it is determined that the operating condition lies in the standard operating range.

The first obstacle check procedure may comprise a predetermined set of steps having a predetermined set of properties, and the second obstacle check procedure may comprise a different set of steps and/or a different set of properties. The steps and/or properties of the second obstacle check procedure may be predetermined. The standard operating range may be predetermined.

The operating condition may be selected from the group consisting of: the temperature of the door sensor equipment; the level of optical noise affecting the door sensor; the level of electronic noise affecting the door sensor equipment; the level of vibration affecting the door sensor equipment and/or the automatic door installation; the voltage of a power supply of the door sensor equipment and/or the automatic door installation; the current consumption of the door sensor equipment and/or the automatic door installation; the level of optical occlusion of a component of the door sensor equipment; the functioning or non-functioning state of one or more components of the door sensor equipment; and the performance of one or components of the door sensor equipment.

Evaluating the operating condition may comprise comparing an output of the door sensor with one or more expected outputs indicative of the presence of an obstacle and/or one or more expected outputs indicative of the absence of an obstacle. For example, the degree of fit between the output and an expected output of the door sensor can affect the ability of the door sensor equipment to determine accurately whether an obstacle is present or absent. Where there is a close fit, an accurate determination can be made. Where the output differs from one or more expected outputs, the determination may be ambiguous. The output may differ from an expected output owing to deterioration of one or more operating conditions. For example, where the door sensor is an optical door sensor, erroneous signals may appear in the output of the sensor where there is optical noise, or it may be difficult to determine a light signal within the output of the sensor owing to a high level of optical and/or electronic noise. An operating condition known to affect the output of the door sensor may be evaluated on the basis of the fit of an output of the sensor to one or more expected outputs, and/or the ability to determine on the basis of the output of the sensor whether an obstacle is present or absent.

The second obstacle check procedure may comprise repeating a step one or more times so that the respective step is performed more times in the contingency mode than in the standard mode. Accordingly an obstacle checking time corresponding to the time period for determining whether an obstacle is present may be greater in the contingency mode than in the standard mode.

For example, in the standard mode, the obstacle check according to the first obstacle check procedure may comprise a step of obtaining a sensor reading and determining whether an obstacle is present, followed by a step of reporting the determination to door control equipment if an obstacle is determined to be present so that a door-closing operation may be prevented, interrupted or reversed. In the contingency mode, the obstacle check according to the second obstacle check procedure may comprise multiple steps of obtaining a sensor reading and determining whether an obstacle is present, to increase the probability that the presence or absence of an obstacle is accurately determined. For example, when the operating condition that lies outside the standard operating range is known to increase the probability that the presence of an obstacle will be falsely determined, the second obstacle check procedure may require two consecutive determinations that an obstacle is present before this is reported to door control equipment. Such a change in the obstacle check may increase the response time of the obstacle check.

The door sensor may be an optical door sensor comprising an emitter for emitting a light signal and a receiver for detecting the light signal, and a property of the obstacle check may differ between the first obstacle check procedure and the second obstacle check procedure, the property being selected from the group consisting of: the carrier frequency of the light signal; the light intensity of the light signal; a frequency-hopping property of the light signal; the time-period of the light signal; the data format of the light signal; and the phase of the light signal.

The door sensor may be an optical door sensor comprising a plurality of emitters for emitting light signals and a plurality of receivers for detecting the light signals, and the obstacle check may comprise determining whether light signals along a set of light paths between the emitters and receivers are detected by the receivers. In the first obstacle check procedure the set of light paths may consist of a plurality of light paths arranged in a first pattern, and in the second obstacle check procedure the set of light paths may consist of a plurality of light paths arranged in a different second pattern.

The second pattern may be variable and may depend on the evaluation of the operating condition. Evaluating the operating condition of the automatic door installation may comprise identifying a non-functioning emitter or receiver. The second pattern may be defined based on the location of the or each non-functioning light path corresponding to the respective non-functioning emitter or receiver in the first pattern. For example, each light path may correspond to an obstacle check area, and the second pattern may comprise one or more light paths not present in the first pattern that intersect the check area associated with the or each non-functioning light path. The second pattern can therefore be defined to compensate for non-working emitters and/or receivers. The second pattern may be defined by the controller and or the analysis module. A non-functioning emitter or receiver may be identified on the basis of a persistent lack of detection of light signals along a particular light path, for example, when compared with receiver outputs corresponding to adjacent light paths.

Alternatively, the door sensor may be a camera sensor. A property of the obstacle check may differ between the first obstacle check procedure and the second obstacle check procedure. The property may be an exposure time of the camera sensor or an image processing procedure for determining the presence of an obstacle The second obstacle check procedure may have a longer time period than the first obstacle check procedure so that the response time of the door sensor is longer in the contingency mode than in the standard mode. It is desirable to minimise the response time of the door sensor since there is an inverse relationship between the response time and the maximum door-closing speed for safe operation of the automatic door installation. However, where the operating conditions have deteriorated to the extent that the door sensor equipment may not function reliably, it is considered to be beneficial to maintain the automatic door installation in operation at the expense of a longer response time and slower door-closing speed, rather than take the automatic door installation out of service.

The door sensor equipment may further comprise an auxiliary door sensor which is only used in the second obstacle check procedure. In other words, the first obstacle check procedure may use the door sensor alone, whereas the second obstacle check procedure may use both the door sensor and the auxiliary door sensor. The door sensor and the auxiliary door sensor may be of different types. For example, the door sensor may be an optical break beam sensor and the auxiliary door sensor may be a camera sensor. The use of an auxiliary door sensor in addition to the door sensor can increase the probability that the presence or absence of an obstacle will be accurately determined. The use of an auxiliary door sensor may be particularly beneficial where the auxiliary door sensor relies on a different technology, since it may not be affected by the deterioration of the operating conditions affecting the door sensor. Use of an auxiliary sensor may incur a penalty in time response of the door sensor equipment.

The second obstacle check procedure may be variable and may be at least partly dependent on the evaluated operating condition. The second obstacle check procedure may be dependent on two or more evaluated operating conditions.

The second obstacle check procedure can be defined on the basis of the operating condition or operating conditions that lie outside of the or each respective standard operating conditions, and/or the extent to which the or each operating condition lies outside of the respective standard operating range. Accordingly, the response of the automatic door installation, in particular the door sensor equipment, can be adapted depending on how the evaluated operating condition or conditions depart from respective standard operating ranges. For example, in general the reliability of the door sensor equipment will depend on the extent to which an operating condition lies outside of its standard operating range. Accordingly, the confidence in the determinations of the door sensor equipment as to whether an obstacle is present will also decrease, and so it is desirable to adjust the obstacle check to increase the confidence that determinations based on the outputs of the door sensor equipment are accurate. The features of the second obstacle check procedure (i.e. the steps of the obstacle check and the properties of the obstacle check) are therefore variable and can be dependent on measures that are indicative of the reliability of the door sensor equipment.

A property of the second obstacle check procedure may be variable and may be dependent on the evaluation of the operating condition. A step of the second obstacle check procedure may be conditional on the evaluated operating condition. In other words, a step of the second obstacle check procedure may be optional, and may be included or omitted from the obstacle check depending on the evaluation of the operating condition.

The method may further comprise determining an excess amount by which the operating condition lies outside of the standard operating range, and the second obstacle check procedure may be at least partly dependent on the excess amount of the respective operating condition.

The method may comprise: evaluating each of a plurality of operating conditions; determining whether each of the operating conditions lies within a respective standard operating range; and operating the automatic door installation in the contingency mode when it is determined that one or more of the operating conditions lies outside the or each respective standard operating range.

The method may comprise: evaluating each of a plurality of operating conditions; determining whether a compound measure based on two or more operating conditions lies outside a respective standard operating range; and operating the automatic door installation in the contingency mode when it is determined that the compound measure lies outside the respective standard operating range. The second obstacle check procedure may be variable and may be at least partly dependent on one or more compound measures, each based on two or more operating conditions.

Operating the automatic door installation in the contingency mode may comprise controlling a door-closing operation so that the door-closing speed is less than the door-closing speed for a door-closing operation in the standard mode. Controlling a door-closing speed may comprise controlling the energy or power delivered to a door controller. Operating the automatic door installation in the contingency mode may comprise setting the door-closing speed for a door-closing operation to less than the door-closing speed for a door-closing operation in the standard mode. For example, in the standard mode the door-closing speed may be 0.5 m/s, whereas in the contingency mode the door-closing speed may be 0.15 m/s.

The door-closing operation may be controlled so that the door-closing speed corresponds to the response time of the obstacle check according to the second obstacle check procedure (i.e. the time period for determining whether an obstacle is present in the contingency mode). For example, if the response time is doubled between the first obstacle check procedure and the second obstacle check procedure, the door-closing speed may be halved to compensate for the reduced responsiveness of the automatic door installation to the presence of an obstacle. Accordingly, the automatic door installation may be able to continue safe operation of the doors in adverse operating conditions.

The door-closing speed may be variable in the contingency mode and may be set on the basis of the or each evaluated operating condition and/or the excess amount by which the or each operating condition lies outside of the respective standard operating range.

Operating the automatic door installation in the contingency mode may comprise controlling a door-closing operation so that a limit door-closing energy is less than the limit door-closing energy for a door-closing operation in the standard mode. Operating the automatic door installation in the contingency mode may comprise setting the limit door-closing energy for a door-closing operation to less than the limit door-closing energy for a door-closing operation in the standard mode. For example, in the standard mode the limit door-closing energy may be 10 joules (approximately 7.4 foot-pounds), whereas in the contingency mode the limit door-closing energy may be 3.4 joules (2.5 foot-pounds). The energy may be set based on a regulatory code, such as the "A17" regulatory code in force in the United States of America.

Operating the door installation in the contingency mode may comprise generating an audible and/or visual warning during a door-closing operation. Accordingly, users of the automatic door installation may be more alert, which may help to avoid a user being impacted by a closing door.

The second obstacle check procedure may be configured to determine more reliably than the first obstacle check procedure whether an obstacle is present. The second obstacle check procedure may be configured to determine with a higher confidence level than the first obstacle check procedure whether an obstacle is present.

The second obstacle check procedure may have a longer response time than the first obstacle check procedure. The second obstacle check procedure may have a longer maximum response time than the first obstacle check procedure.

The automatic door installation may be an elevator installation comprising an elevator car. Operating the automatic door installation in the contingency mode may include causing the elevator car to move in an elevator car journey.

According to a further aspect of the invention there is provided door sensor equipment for an automatic door installation, the door sensor equipment comprising: a door sensor; and analysis apparatus configured to evaluate an operating condition of the automatic door installation, determine whether the operating condition lies within a standard operating range, and switch from a standard mode of operation to a contingency mode of operation when it is determined that the operating condition lies outside the respective standard operating range; wherein in the standard mode the door sensor equipment is configured to conduct an obstacle check to determine whether an obstacle is present according to a first obstacle check procedure, and wherein in the contingency mode the door sensor equipment is configured to conduct the obstacle check according to a different second obstacle check procedure.

The door sensor equipment may be operable in accordance with a method of operating an automatic door installation described herein.

According to a further aspect of the invention there is provided an automatic door installation comprising door sensor equipment as described herein.

The automatic door installation may be an elevator installation comprising an elevator car. The elevator installation may be configured so that a door-closing operation is prevented, interrupted or reversed when it is determined that an obstacle is present. The elevator installation may be configured so that an elevator car journey can only begin after it has been determined that no obstacle is present.

BRIEF DESCRIPTION OF THE SEVERAL VIEWS OF THE DRAWING(S)

Figure 2:
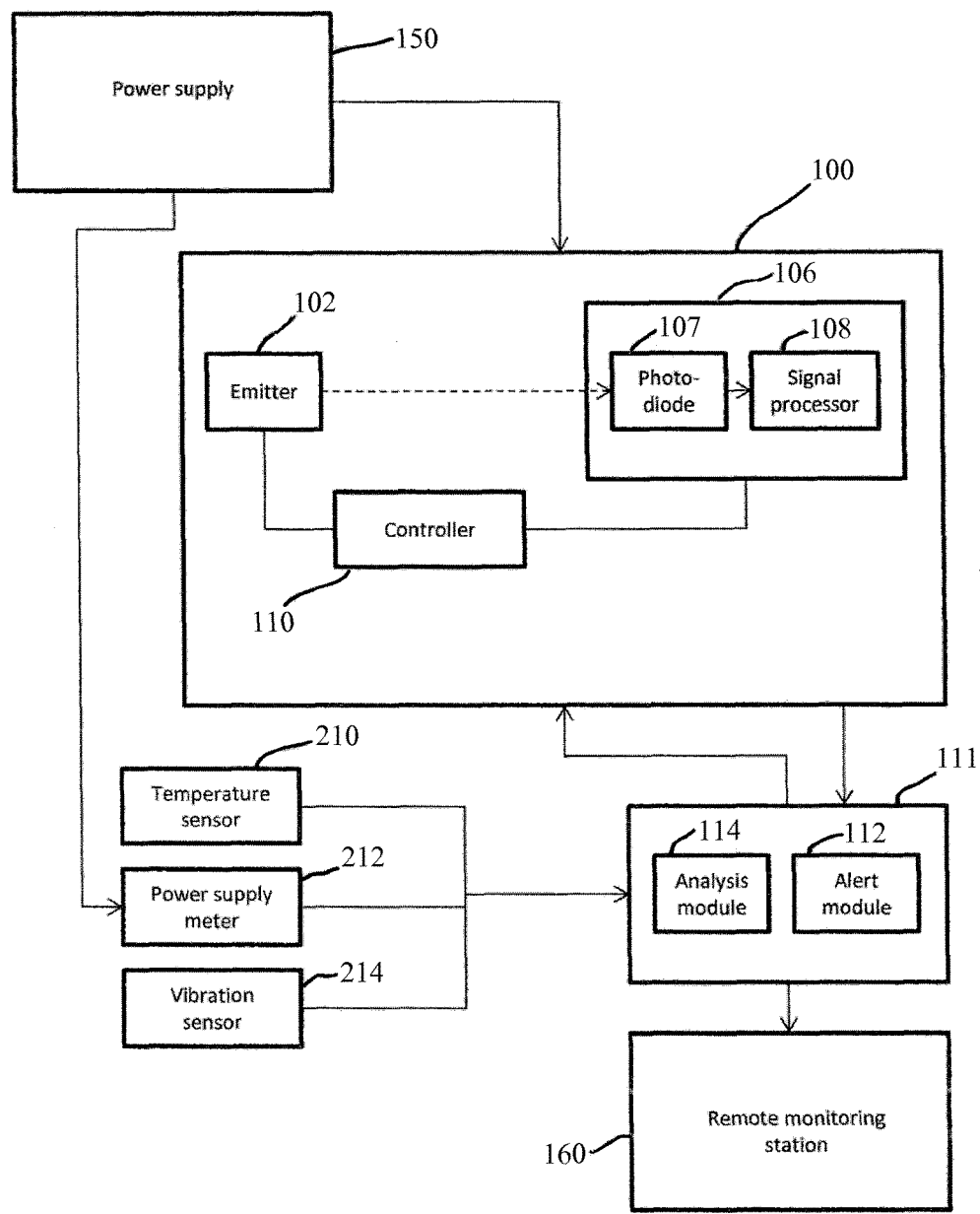
Figure 3:
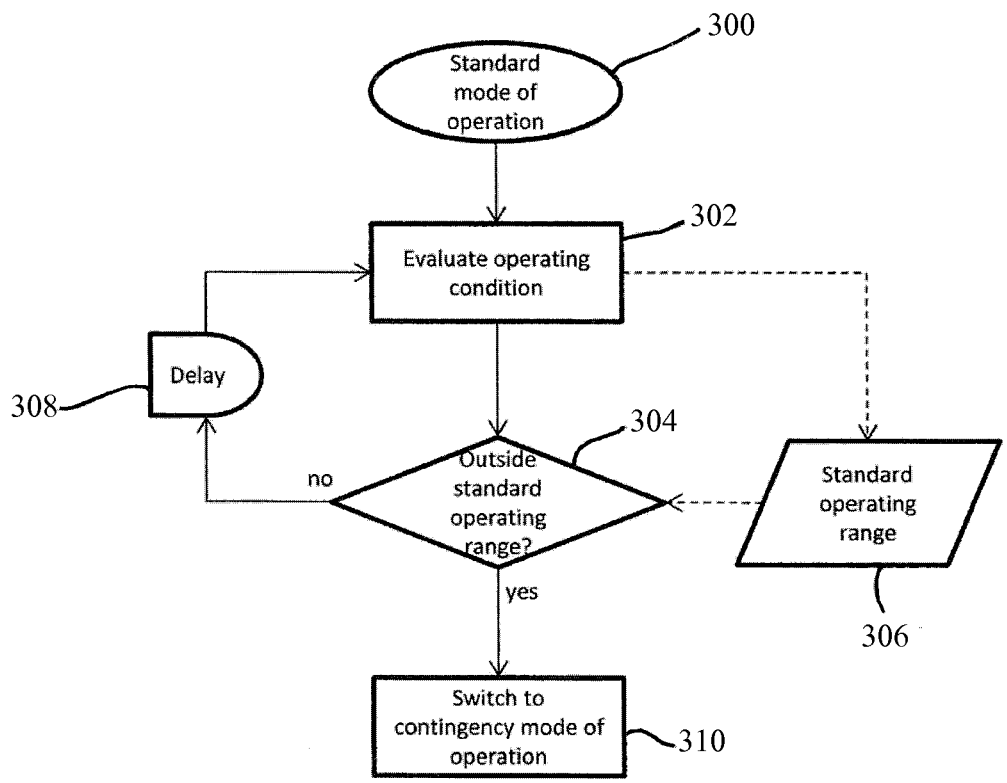

The invention will now be described, by way of example, with reference to the following drawings, in which:

FIG. 1 schematically shows an elevator car of an elevator installation according to an embodiment of the invention;

FIG. 2 schematically shows door sensor equipment of the elevator installation of FIG. 1;

FIG. 3 schematically shows a method of operating the elevator installation of FIG. 1 according to an embodiment of the invention.

Figure 4:
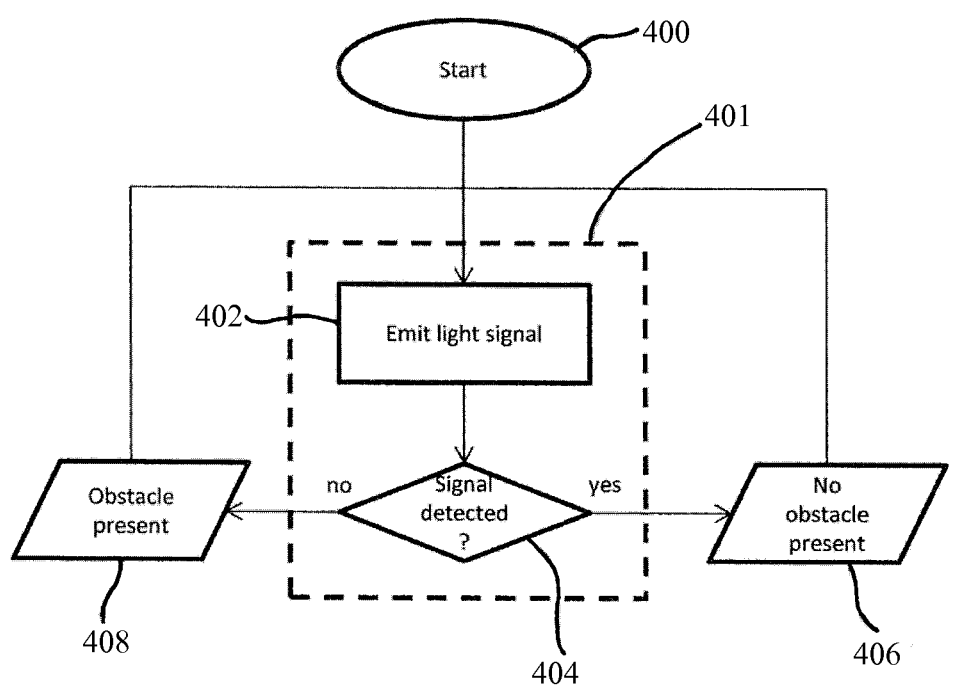
Figure 5:
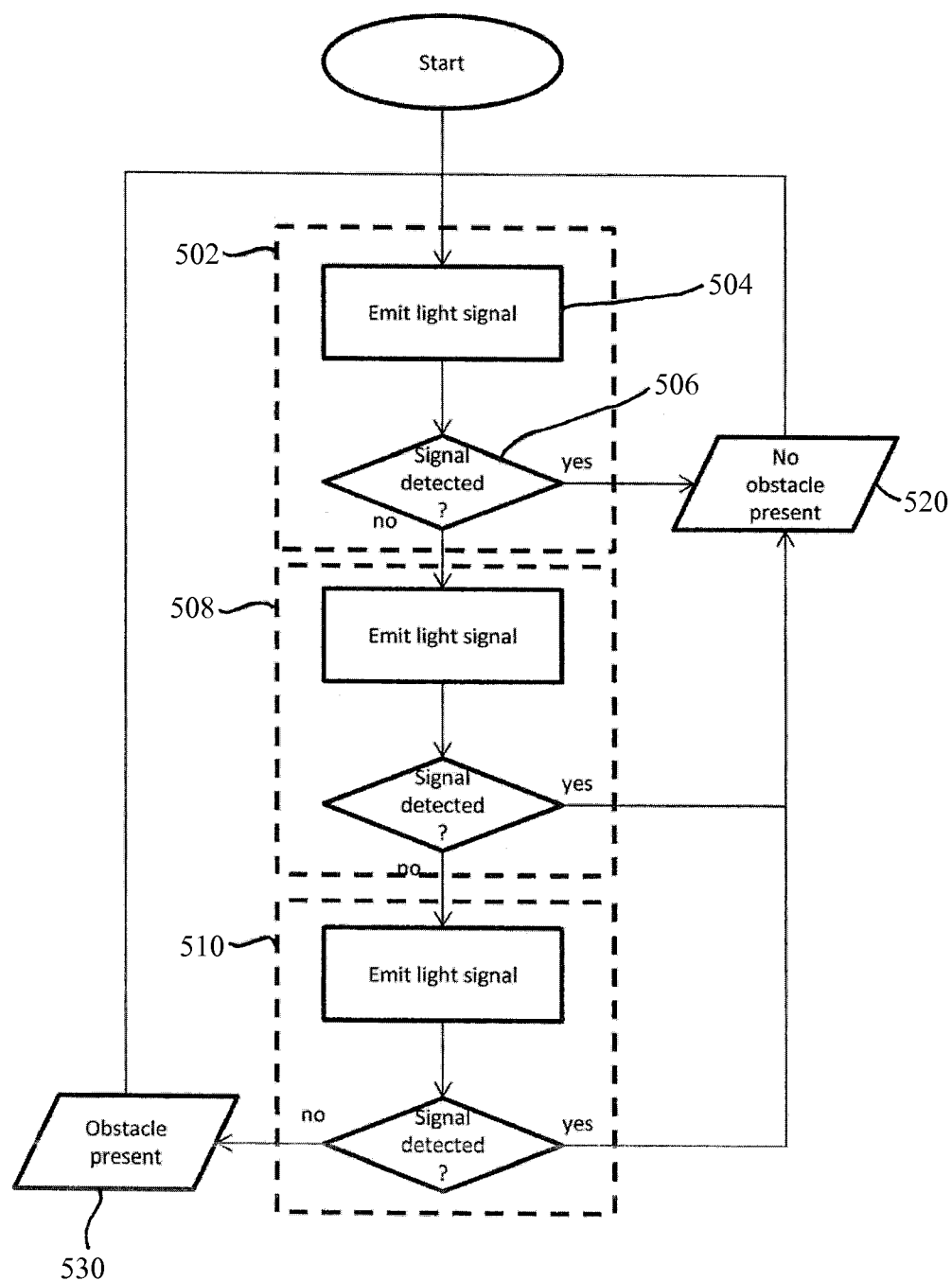

FIG. 4 schematically shows an obstacle check in the standard mode of operation; and FIG. 5 schematically shows an obstacle check in the contingency mode of operation.

DETAILED DESCRIPTION OF THE INVENTION

FIG. 1 shows an elevator car 10 of an elevator installation. The elevator car 10 is moveable within a shaft (not shown) of the elevator installation and has a pair of automatic elevator car doors 12 that can be controlled to open and close by a controller. The elevator installation is therefore an automatic door installation. The elevator car 10 is provided with door sensor equipment including a door sensor 100 attached to the elevator car 10 by sensor mounts 14. The door sensor 100 is configured to conduct an obstacle check to determine whether an obstacle, such as a person or object, is present in front of or between the elevator car doors.

In this particular embodiment the door sensor 100 is an optical door sensor comprising an emitter array 101 for emitting infrared light signals and a receiver array 105 for detecting the light signals. The sensor mounts 14 are arranged to hold the emitter array 101 and the receiver array 105 in the space between the elevator car 10 and the walls of the shaft. In particular, the sensor mounts 14 hold the emitter array 101 and the receiver array 105 opposite each other and aligned so that they can define a light curtain 103 between them, consisting of an array of individual infrared light signals 104 (or light beams), in the space between the elevator car doors 12 and the shaft doors installed at stop positions of the elevator installation. The emitter array 101 and the receiver array 105 each comprise a plurality of individual emitters 102 and receivers 106 respectively.

The door sensor equipment further comprises a sounder 120 for emitting an audible alert when an obstacle check determines that an obstacle is present, or other audible warning.

In this embodiment, the door sensor equipment further comprises an auxiliary door sensor 130 which is a camera sensor configured to detect the presence or absence of an obstacle in front or between the elevator car doors by image processing.

FIG. 2 schematically shows components of the door sensor equipment together with sensors of the elevator installation for monitoring the operating conditions of the elevator installation, and a power supply 150. FIG. 2 shows the optical door sensor 100 with detail relating to a single emitter and receiver pair 102, 106 of the emitter array 101 and receiver array 105 respectively.

The door sensor includes a controller 110 for repeatedly conducting an obstacle check to determine whether an obstacle is present. In this embodiment, each obstacle check comprises one or more signal tests using the emitters 102 and receivers 106 of the emitter array 101 and the receiver array 102 respectively. In the signal test, the controller 110 causes the emitters 102 to emit light signals 104, and determines whether the emitted light signals 104 are detected by the receivers 106. Accordingly, it can be determined whether an obstacle, such as a person or object, is present in front of the elevator car doors 12. In particular, the optical door sensor 100 is a break beam sensor configured to determine that an obstacle is present when a light signal 104 from an emitter 102 is not received by a corresponding receiver 106 (i.e. a negative signal test result), and to determine that no obstacle is present when each of the receivers 106 receive a light signal 104 from respective emitters 102 (i.e. a positive signal test result).

The light signals 104 are not coded, and each light signal comprises an active signal portion including flashes of infrared light, and an inactive signal portion in which there are no flashes of infrared light. Accordingly, the light signals 104 are not arranged to carry any data. In other embodiments, each light signal could be encoded to carry data, such as the identity of the respective emitter 102 of the emitter array 101 from which it is emitted, and the receivers 106 could be configured to decode light signals they receive to confirm whether each light signal is from a paired emitter 102. For example, the signals could be encoded by amplitude-shift keying or another form of modulation.

The receiver 106 is provided with a light sensor in the form of a photodiode 107 and a signal processor 108 (which is common between the receivers 106 of the receiver array 102) for processing the output of the photodiode 107 and detecting the emitted light signal 104.

The elevator installation further comprises a number of sensors including a temperature sensor 210; a power supply meter 212 and a vibration sensor 214. The temperature sensor 210 and vibration sensor 214 are mounted on the door sensor 100 so that the monitored temperature and vibration levels are indicative of the conditions experienced by components of the door sensor 100. The power supply meter 212 is integrated with the power supply for the door sensor equipment.

The door sensor equipment further comprises analysis apparatus 111 including an analysis module 114 and an alert module 112. The analysis module 114 is configured to evaluate the operating conditions of the elevator installation, in particular the door sensor equipment, based on outputs of the door sensor 100 and other sensors 210, 212, 214 of the elevator installation, as will be described in detail below. The alert module 112 is configured to generate an alert when it is determined that an operating condition of the elevator installation lies outside a respective standard operating range. In this embodiment the alert module 112 is a wireless transmitter arranged to transmit an alert to a remote monitoring station 160.

The door sensor equipment, and so the elevator installation, has a standard mode and a contingency mode of operation, and the analysis module 114 is configured to change from the standard mode to the contingency mode when it determines that at least one of the operating conditions of the elevator installation lies outside of the respective standard operating range. In particular, the controller 110 is configured to conduct the obstacle check according to a first obstacle check procedure when operating in the standard mode, and to conduct the obstacle check according to a different second obstacle check procedure when operating in the contingency mode.

The second obstacle check procedure is configured so that the presence or absence of an obstacle can be more reliably determined than the first obstacle check procedure, in view of the deterioration in the operating condition or conditions of the elevator installation.

As shown in FIG. 3, under normal operating conditions the elevator installation operates in the standard mode (300) in which the door sensor equipment conducts the obstacle check according to the first obstacle check procedure. The analysis module 114 evaluates a number of different operating conditions of the elevator installation (302) and determines whether each operating condition lies outside of a respective standard operating range (304). The respective standard operating ranges are stored in a memory of the analysis apparatus (306). If it is determined that the evaluated operating conditions lie within the respective standard operating ranges then the elevator installation continues to be operated in the standard mode (300). After a delay (308), the operating conditions of the elevator installation will again be evaluated (302), and the above-described process will continue in a loop. If it is determined that one or more evaluated operating conditions lie outside the respective standard operating range, the analysis module 114 switches to a contingency mode of operation for the elevator installation. In the contingency mode, the door sensor equipment conducts the obstacle check according to the second obstacle check procedure.

As described above, the analysis module 114 is configured to evaluate a number of different operating conditions of the elevator installation (302). The operating conditions are those conditions which may affect the performance and/or reliability of the door sensor equipment. In this embodiment, the analysis module 114 evaluates operating conditions including the temperature of the door sensor equipment; the level of optical noise affecting the door sensor; the level of electronic noise affecting the door sensor equipment; the level of vibration affecting the door sensor equipment and/or the elevator installation; the voltage of the power supply and the current consumption from the power supply, a level of optical occlusion of the emitters 102 and/or receivers 106 of the door sensor 100, the functioning or non-function state of the door sensor components, and the performance of the door sensor components.

The temperature of the door sensor equipment is evaluated based on the output of the temperature sensor 210. The standard operating range relates to the rated temperature ranges for the door sensor equipment, which in this embodiment is between −20° C. and +65° C.

The level of optical or electronic noise is evaluated using the signal processor 108 and the analysis module 114. In use, the signal processor 108 filters the output of the receiver 106, in particular the photodiode 107, in order to detect a known light signal from an emitter, according to known signal processing techniques. If there is excessive optical or electronic noise, the receiver 106 and signal processor 108 may fail to detect a light signal from a respective emitter 102. For example, the receiver 106 may fail to detect a light signal from a respective emitter 102 when the amplitude, frequency or phase of the noise conflicts with the amplitude, frequency or phase of the light signal, or of the expected output of the photodiode 107 in response to reception of a light signal.

The signal processor 108 isolates a noise signal and characterises the noise signal. For example, the amplitude, phase and frequency of the noise signal can be characterised. The analysis module 114 compares the amplitude, phase and frequency of the noise signal with standard operating ranges (or noise thresholds) for these parameters to determine if the level of noise is excessive. The standard operating ranges are defined so that noise signals which may affect the reliability of the optical door sensor are considered to be excessive. For example, the standard operating range for amplitude is defined based on a signal-to-noise ratio relative to the expected output of the receiver 106 when receiving a light signal. The standard operating ranges for phase and frequency are defined to avoid conflict with the light signal.

The sources of optical noise for a receiver 106 include cross-talk from emitters 102 which are not associated with the receiver 106. The sources of electronic noise include equipment sharing a common power supply 150, for example industrial or construction equipment, electromagnetic interference (EMI) including radio frequency signals, and sources of magnetic interference. The level of electronic noise can be isolated from the level of optical noise from cross-talk by sampling the noise signal whilst no light signals 104 are being emitted. The level of noise is determined by rms (route mean square) analysis of the amplitude of the output of the photodiode or receiver whilst no light signals are emitted from the emitters.

In this embodiment, the signal processor 108 reports the level of noise to the analysis apparatus 114 in terms of a signal-to-noise ratio. It will be appreciated that the level of noise reported by the signal processor 108 may be due to a combination of optical noise and electrical noise. In this embodiment the standard operating range for noise is set corresponding to a maximum signal-to-noise ratio of 1:0.8.

In other embodiments, the standard operating range may be correspond to a threshold noise value. For example, the threshold noise value can be set as a multiple of a noise level measurement during commissioning of the elevator installation. Alternatively, the threshold noise level can be pre-programmed, for example, based on a rated specification for the optical door sensor.

In other embodiments, the signal processor 108 may undertake further or alternative analyses of the noise. For example, the frequency and phase of the noise may be analysed, and the standard operating range may be defined to exclude noise signals that may compromise the detection by the receiver 106 of light signals from a respective emitter 102.

The signal processor 108 and analysis module are also configured to characterise the noise and determine whether the source of noise is optical or electronic noise. Accordingly, the second obstacle check procedure can be defined based on whether the source of noise is optical or electronic noise. For example, in this embodiment the analysis module 114 stores characteristics for sources of optical noise, electromagnetic interference (i.e. electronic noise) from nearby radio frequency transmissions, electronic noise that is characteristic of a bad earth in the building, and electronic noise originating from a shared power supply. In particular, the analysis module 114 stores characteristics of electronic noise generated from various types of industrial and/or construction equipment, including equipment that in many jurisdictions is required to have a dedicated power supply isolated from the building power supply. A possible source of noise is determined by conducting a spectral analysis on the noise to identify peak noise frequencies, and correlating (i.e. comparing) the peak noise frequencies identified with stored peak frequencies for known noise sources. For example, electronic lighting ballasts are known to have peak frequencies in the 10 kHz to 100 kHz range that can be detected by known digital signal processing techniques. Accordingly, if a noise signal is found to have peak noise frequencies corresponding to peak noise frequencies for an electronic lighting ballast, the analysis module 114 will determine that an electronic lighting ballast is a possible source of the excessive noise.

The level of vibration affecting the door sensor equipment is evaluated based on the output of the vibration sensor 214. The standard operating range can relate to the rated frequency and amplitudes for the door sensor equipment. For example, the standard operating range can be defined to have different allowable vibration ranges for different frequency ranges, and the level of vibration can be assessed by spectral analysis of vibration within these different frequency ranges. Further, the standard operating range may be defined to exclude certain known vibration sources having a specific spectral and/or amplitude signature or fingerprint (such as worn bearings). In this embodiment, the standard operating range is defined in terms of maximum limit vibration amplitudes for three different frequency ranges, with each limit vibration amplitude being set at a value corresponding to three times a commissioning amplitude determined during elevator commissioning for the respective frequency range. Accordingly, the standard operating range for vibration elevator is set empirically to detect significant increases in operational vibration. For instance, operational vibration may increase owing to worn bearings, deterioration of door tracks for the doors or contamination of the door tracks with obstacles such as grit.

The voltage of the power supply for the door sensor equipment is measured by the power supply meter 212 and the standard operating range in this embodiment is between 18 V and 30 V. The range depends on the equipment and the characteristics or the local power network. The current consumption of the door sensor equipment is measured by the power supply meter 212 and the standard operating range in this embodiment is between 80 mA and 120 mA. A high level of current consumption can indicate failure of a component of the door sensor.

A number of different measures can indicate the optical occlusion of components of the door sensor 100, in particular the emitters 102 and receivers 106. The optical occlusion relates to the degree by which light is prevented from passing out from or reaching a component, for example due to the build-up of material such as dust on surfaces of the equipment. For example, the level of optical occlusion affecting an emitter and receiver pair 102, 106 can be evaluated based on the output of the respective photodiode 107 of the receiver 106 during the reception of a light signal 104 compared to an expected output. In particular, in this embodiment the level of optical occlusion is evaluated on the basis of the amplitude of the output of the photodiode 107 for each receiver 106 compared with the amplitude of an expected output. The standard operating range is a ratio of at least 0.6 between the amplitude of the output compared with the expected amplitude.

Similarly, a number of different measures can indicate the performance of the components of the door sensor 100, in particular the emitters 102 and the receivers 106. The performance of the components relates to the degree to which they are operating normally. For example, the performance of an emitter may gradually deteriorate over time owing to degradation of the emitter itself, rather than outside influences such as the build of material such as dust on the surfaces of the equipment. Similarly, the sensitivity of the receiver may reduce over time.

In this embodiment, the performance of an emitter and receiver pair is evaluated based on the output of the respective photodiode 107 of the receiver 106 during the reception of a light signal 104 compared to an expected output, as described above. The standard operating range is a ratio of at least 0.6 between the amplitude of the output compared with the expected output.

In other embodiments, the performance may be predicted on the basis of other criteria. For example, the performance may be predicted based on the record of error checking failure or success between components of the door sensor equipment. For example, where the light signals are encoded, error checks may include parity-checks conducted between emitters and receivers. In particular, a light signal may include a repeated data portion, and the error check may comprise determining whether both instances of the data portion as detected by the receiver are determined to be identical.

The functioning or non-functioning state of the components of the door sensor equipment is determined based on whether each receiver can detect an emitted light signal. In this embodiment, the light curtain 103 in the standard mode of operation comprises an array of parallel signals between emitter-receiver pairs, with each emitter 102 emitting a light signal along a single light path towards a receiver 106. Accordingly, where a receiver 106 fails to detect a light signal, it cannot be immediately determined whether the failure is in the emitter 102 or the receiver 106. An emitter-receiver pair in which the receiver fails persistently to detect a light signal (i.e. in more than a threshold number of consecutive signal tests or obstacle checks), despite adjacent emitter-receiver pairs receiving a light signal (i.e. emitter-receiver pairs having adjacent or nearby light paths) is indentified as being in a non-functioning state.

In other embodiments, an emitter may emit a plurality of light signals 104 to more than one receiver 106, and/or a receiver 106 may be arranged to receive a plurality of light signals 104 from different emitters 102. In such embodiments, it may be possible for the analysis module 114 to deduce whether an emitter 102 or a receiver 106 is in a non-functioning state when a light signal is not detected.

In this embodiment, the standard operating range is a functioning state for all emitter-receiver pairs (i.e. all light paths). In other embodiments, the functioning or non-functioning state of the door sensor components can be evaluated based on the record of recent failed or interrupted door-closing operations in which the door sensor equipment failed to detect an obstacle and the door-closing operation failed, for example as a result of the detection of an obstacle by a separate door edge sensor such as a force sensor. A trend of failed or interrupted door-closing operations may indicate that the components of the door sensor are not functioning correctly.

The difference between the obstacle check in the standard mode and contingency mode in response to the evaluation of the or each operating condition will now be described.

As described above, under normal operating conditions, the obstacle check is conducted according to the first obstacle check procedure. As shown in FIG. 4, in this embodiment, the obstacle check according to the first obstacle check procedure comprises a single signal test (401) for each emitter-receiver pair of the optical door sensor 100. The emitter 102 emits a first light signal in the standard mode (402) which comprises 2000 25-microsecond flashes of infrared light separated by 25-microsecond intervals in an active signal portion of 100 milliseconds duration, followed by a 100-millisecond inactive signal portion in which no infrared light is emitted. The 25-microsecond flashes correspond to a carrier frequency of the light signal of 40 kHz. The receiver 106 is configured to detect this light signal 104 in the standard mode (404). If it is determined that the light signal 104 is detected by the receiver, then it can be concluded (406) that there is no obstacle present between the emitter 102 and the receiver 106. In contrast, if the light signal 104 is not detected by the receiver, then it can be concluded (408) that there is an obstacle present between the emitter 102 and the receiver.

In the contingency mode of operation, the obstacle check is conducted according to the second obstacle check procedure, which is defined so as to improve the reliability of the door sensor equipment in determining the presence or absence of an obstacle.

As shown in FIG. 5, in the second obstacle check procedure three signals tests are conducted so that the receiver 106 has up to three chances to detect the light signal. Accordingly, the second obstacle check allows the receiver 106 to fail to detect a light signal from the emitter 102 up to twice, without it being wrongly determined that an obstacle is present. In the second obstacle check procedure, a first instance of the light signal is emitted (504) in a first signal test (502), as in the standard mode of operation. If it is determined (506) that the light signal 104 is detected by the receiver 106, then it can be concluded that no obstacle is present (520). If not, a second instance of the light signal is emitted (504) as part of a second signal test (508) in the same obstacle check procedure. Again, if it is determined (506) that the light signal 104 is detected by the receiver 106, then it can be concluded that no obstacle is present (520). If not, a third instance of the light signal is emitted (504) as part of a third signal test (510) in the same obstacle check procedure. Again, if it is determined (506) that the light signal 104 is detected by the receiver 106, then it can be concluded that no obstacle is present (520). However, if the light signal 104 is not detected, then it is finally determined that an obstacle is present (530).

In other embodiments, the second obstacle check procedure may always comprise a predetermined number of signal tests, and the obstacle check may determine that no obstacle is present if at least one of the light signals is detected.

As a consequence of repeating the signal test up to three times before determining whether an obstacle is present or not, the signal response time is increased in the second obstacle check procedure. However, an increase in the signal response time is an acceptable penalty to prevent the elevator installation from being taken out of service.

Accordingly, in the contingency mode of operation, any door-closing operation is controlled so that the door-closing speed is less than the door-closing speed for a door-closing operation in the standard mode to compensate for the increased response time of the door sensor. In this embodiment, the door-closing speed is controlled by limiting a door-closing energy of the elevator doors. In particular, the drive energy is limited to 10 joules in the standard mode of operation and is limited to 3.4 joules in the contingency mode.

In addition to repeating the signal test more than once, a number of properties of the obstacle check are adjusted in the second obstacle check procedure to differ from the first obstacle check procedure.

For example, when it is determined that a measure of noise exceeds the respective standard operating range, the properties of the light signal are adjusted to compensate for an adverse level of noise. In this embodiment, the second obstacle check procedure comprises emitting light signals having an active signal portion of 150 milliseconds followed by an inactive signal portion of 150 milliseconds, when the signal-to-noise ratio is between 1:0.8 and 1:1. Accordingly, light signals are longer in duration in the second obstacle check procedure than in the first obstacle check procedure by a total of 100 milliseconds, which means that the response time of the sensor (i.e. the time taken for the receiver 106 to detect the light signal) is also longer.

Further, if the signal-to-noise ratio deteriorates further to between 1:1 and 1:1.5, the duration of the light signals is increased further in the second obstacle check procedure so as to comprise an active signal portion of 200 milliseconds, followed by an inactive signal portion of 200 milliseconds. A longer signal duration increases the probability that it will be possible to detect the light signal. Therefore, as the operating conditions of the elevator installation deteriorate and the reliability of the door sensor equipment deteriorates, the second obstacle check procedure can be adapted so as to mitigate the deterioration of the operating conditions. The second obstacle check procedure is therefore variable and dependent on the excess amount by which an operating condition lies outside of the standard operating range.

Accordingly, in this embodiment, the second obstacle check procedure is variable and depends on the evaluated operating condition that has been determined to lie outside the standard operating range, as will be described below. However, in other embodiments, the second obstacle check procedure may be fixed.

Further, the carrier frequency of the light signal 104 changes during the active signal portion by frequency hopping so as to mitigate the effect of excessive noise. In this example, the carrier frequency is 40 kHz, 36 kHz and 38 kHz for first, second and third approximately equal sections of the active signal portions of the signal respectively. The receiver 106 is configured to detect the light signal at the different carrier frequencies as it changes between them. In other embodiments, the phase of the light signal may be adjusted to avoid noise signals of a similar frequency. In embodiments where the light signal is encoded, the data format may be adjusted (e.g. the data modulation format).

Further, the intensity of the light signals is higher in the second obstacle check procedure than in the first obstacle check procedure to improve the probability that light signals are detected.

Further, when it is determined that at least one emitter-receiver pair is non-functioning, the second obstacle check procedure is adjusted to compensate for the loss of light paths associated with the emitter-receiver pair. For example, in this embodiment the first obstacle check procedure comprises determining whether light signals along a set of light paths consisting of an array of parallel light paths are detected by the receivers. Accordingly, each emitter 102 is paired with a corresponding receiver 106 in an emitter-receiver pair. If a particular emitter-receiver pair is determined to be non-functioning, the corresponding light path is no longer functioning.

In this embodiment, the emitters 102 can be controlled to direct light signals to more than one different receiver 106 and the second obstacle check procedure can be varied in response to the non-functioning state of an emitter and/or receiver to introduce additional light paths that pass through a check area associated with non-functioning light paths (i.e. at an angle with respect to the parallel light paths). Accordingly, the light curtain 103 can be adjusted to mitigate the loss of a particular light path.

In addition, in this embodiment the auxiliary door sensor is activated and used in the second obstacle check procedure when more than one emitter, receiver or emitter-receiver pair are determined to be in a non-functioning state. The auxiliary door sensor is a camera sensor and, when activated, the second obstacle check procedure additionally comprises comparing an image captured by the camera sensor with images relating to the absence of an obstacle and determining whether an obstacle is present. An obstacle is determined to be present when either the optical door sensor described above or the camera sensor determine that an obstacle is present.

In this embodiment, the elevator installation only reverts to the standard mode upon manual instruction, so that the deterioration in the operating conditions of the automatic door installation must always be investigated and resolved for normal operation to resume. However, in other embodiments, the elevator installation may be configured to revert to the standard mode of operation if it is determined that the or each operating condition is within the respective standard operating range.

Although an embodiment of the invention has been described in which, in at least a standard mode of operation, light signals are emitted along parallel light paths, it will be appreciated that in other embodiments the light paths may be non-parallel and may intersect one another.

Although an embodiment of the invention has been described in which a number of different operating conditions are evaluated, it will be appreciated that in other embodiments a single operating condition may be evaluated. It will be appreciated that several different operating conditions may affect the various sensors of the elevator installation and outputs of the door sensor equipment in similar ways. Accordingly, the measures for particular operating conditions that have been described may be affected by more than one operating condition. For example, optical noise and electronic noise both affect the output of a photodiode in similar ways, and so it may not be possible to isolate the effect of optical noise on the signal-to-noise ratio.

It will be appreciated that the term "light" means electromagnetic radiation including both visible light and non-visible light such as infrared and ultraviolet light.

Embodiments of an optical door sensor have been described in which there is an emitter array having a plurality of emitters and a receiver array having a plurality of receivers. It will be appreciated that the optical door sensor or a door controller may be configured so that an obstacle is determined to be present only when a minimum number of receivers, greater than one, fail to detect a light signal from respective emitters. In other words, a limited number of receivers may be able to fail to detect a light signal without causing the optical door sensor to operate as if the presence of an obstacle has been determined. Accordingly, an obstacle check for the optical door sensor may comprise emitting light signals from the plurality of emitters, and determining whether a predetermined minimum number of receivers detect the light signals.

The invention claimed is:

1. A method of operating an automatic door installation comprising door sensor equipment including a door sensor, the automatic door installation being operable in at least a standard mode, in which the door sensor equipment conducts an obstacle check to determine whether an obstacle is present according to a first obstacle check procedure, and a contingency mode, in which the door sensor equipment conducts the obstacle check according to a different second obstacle check procedure, the method comprising:
    evaluating an operating condition of the automatic door installation;
    determining whether the operating condition lies within a predetermined operating range; and
    operating the automatic door installation in the contingency mode when the operating condition lies outside a respective predetermined operating range.

2. A method according to claim 1, wherein the operating condition is selected from the group consisting of:
    a temperature of the door sensor equipment;
    a level of optical noise affecting the door sensor;
    a level of electronic noise affecting the door sensor equipment;
    a level of vibration affecting the door sensor equipment or the automatic door installation;
    a voltage of a power supply of the door sensor equipment or the automatic door installation;
    a current consumption of the door sensor equipment or the automatic door installation;
    a level of optical occlusion of a component of the door sensor equipment;
    a functioning or non-functioning state of one or more components of the door sensor equipment; and
    a performance of one or more components of the door sensor equipment.

3. A method according to claim 1, wherein the second obstacle check procedure comprises repeating a step one or more times so that a respective step is performed more times in the contingency mode than in the standard mode.

4. A method according to claim 1, wherein the door sensor is an optical door sensor comprising an emitter for emitting a light signal and a receiver for detecting the light signal, and wherein a property of the obstacle check differs between the first obstacle check procedure and the second obstacle check procedure, the property being selected from the group consisting of:
    a carrier frequency of the light signal;
    a light intensity of the light signal;
    a frequency-hopping property of the light signal;
    a time-period of the light signal;
    a data format of the light signal; and
    a phase of the light signal.

5. A method according to claim 1, wherein the door sensor is an optical door sensor comprising a plurality of emitters for emitting light signals and a plurality of receivers for detecting the light signals, the obstacle check comprising determining whether light signals along a set of light paths between the emitters and receivers are detected by the receivers, wherein in the first obstacle check procedure the set of light paths consists of a plurality of light paths arranged in a first pattern, and wherein in the second obstacle check procedure the set of light paths consists of a plurality of light paths arranged in a different second pattern.

6. A method according to claim 1, wherein the second obstacle check procedure has a longer time period than the first obstacle check procedure so that a response time of the door sensor is longer in the contingency mode than in the standard mode.

7. A method according to claim 1, wherein the door sensor equipment further comprises an auxiliary door sensor which is only used in the second obstacle check procedure.

8. A method according to claim 1, wherein the second obstacle check procedure is variable and is at least partly dependent on an evaluated operating condition.

9. A method according to claim 8, further comprising determining an excess amount by which the operating condition lies outside of the predetermined operating range, and wherein the second obstacle check procedure is at least partly dependent on an excess amount of a respective operating condition.

10. A method according to claim 1, wherein the method comprises:
    evaluating each of a plurality of operating conditions;
    determining whether each of the operating conditions lies within a respective predetermined operating range; and
    operating the automatic installation in the contingency mode when one or more operating conditions lies outside a respective predetermined operating range.

11. A method according to claim 1, wherein operating the automatic door installation in the contingency mode comprises controlling a door-closing operation so that the door-closing speed is less than the door-closing speed for a door-closing operation in the standard mode.

12. A method according to claim 1, wherein the automatic door installation is an elevator installation comprising an elevator car.

13. A method of operating an elevator installation comprising door sensor equipment including a door sensor, the automatic door installation being operable in at least a standard mode, in which the door sensor equipment conducts an obstacle check to determine whether an obstacle is present according to a first obstacle check procedure, and a contingency mode, in which the door sensor equipment conducts the obstacle check according to a different second obstacle check procedure, the method comprising:
    evaluating an operating condition of the automatic door installation;
    determining whether the operating condition lies within a predetermined operating range; and
    operating the automatic door installation in the contingency mode when an operating condition lies outside a respective predetermined operating range;
        wherein the operating condition is selected from the group consisting of:
    the temperature of the door sensor equipment;
    a level of optical noise affecting the door sensor;
    a level of electronic noise affecting the door sensor equipment;
    a level of vibration affecting the door sensor equipment or the automatic door installation;
    a voltage of a power supply of the door sensor equipment and/or the automatic door installation;
    a current consumption of at least one of the door sensor equipment and the automatic door installation;
    a level of optical occlusion of a component of the door sensor equipment;
    a functioning or non-functioning state of one or more components of the door sensor equipment; and
    a performance of one or more components of the door sensor equipment; and
        wherein the door sensor is an optical door sensor comprising an emitter for emitting a light signal and a receiver for detecting the light signal, and wherein a property of the obstacle check differs between the first obstacle check procedure and the second obstacle check procedure, the property being selected from the group consisting of:
    a carrier frequency of the light signal;
    a light intensity of the light signal;
    a frequency-hopping property of the light signal;
    a time-period of the light signal;
    a data format of the light signal; and
    a phase of the light signal.

* * * * *